United States Patent
Qian et al.

(10) Patent No.: US 9,711,931 B1
(45) Date of Patent: Jul. 18, 2017

(54) NONCOLLINEAR ACHROMATIC PHASE MATCHING BASED OPTICAL PARAMETRIC CHIRPED-PULSE AMPLIFIER WITH INSENSITIVITY TO TEMPERATURE AND WAVELENGTH

(71) Applicant: Shanghai Jiao Tong University, Shanghai (CN)

(72) Inventors: Liejia Qian, Shanghai (CN); Daolong Tang, Shanghai (CN); Jingui Ma, Shanghai (CN); Jing Wang, Shanghai (CN); Bingjie Zhou, Shanghai (CN); Peng Yuan, Shanghai (CN); Guoqiang Xie, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 0 days.

(21) Appl. No.: 15/442,347

(22) Filed: Feb. 24, 2017

(30) Foreign Application Priority Data

Oct. 19, 2016 (CN) .......................... 2016 1 0910788

(51) Int. Cl.
| | |
|---|---|
| *G02F 1/39* | (2006.01) |
| *H01S 3/108* | (2006.01) |
| *H01S 3/094* | (2006.01) |
| *H01S 3/00* | (2006.01) |
| *H01S 3/13* | (2006.01) |
| *H01S 3/16* | (2006.01) |

(52) U.S. Cl.
CPC .............. *H01S 3/1083* (2013.01); *G02F 1/39* (2013.01); *H01S 3/0057* (2013.01); *H01S 3/094026* (2013.01); *H01S 3/094049* (2013.01); *H01S 3/1301* (2013.01); *G02F 2001/392* (2013.01); *H01S 3/1611* (2013.01); *H01S 3/1625* (2013.01); *H01S 3/1643* (2013.01); *H01S 3/1673* (2013.01)

(58) Field of Classification Search
None
See application file for complete search history.

(56) References Cited

U.S. PATENT DOCUMENTS

| 6,181,463 B1* | 1/2001 | Galvanauskas | G02F 1/39 |
| | | | 359/330 |
| 2006/0013272 A1* | 1/2006 | Kopf | H01S 3/0057 |
| | | | 372/30 |
| 2007/0013995 A1* | 1/2007 | Kaertner | G02F 1/133 |
| | | | 359/330 |

* cited by examiner

*Primary Examiner* — Hemang Sanghavi
(74) *Attorney, Agent, or Firm* — Mei & Mark LLP; Manni Li

(57) ABSTRACT

A simultaneous temperature- and wavelength-insensitive parametric amplifier comprising a pump laser, a signal laser, and a crystal amplifier. The pump laser system on a first optical pathway includes a $Nd:YVO_4$ laser oscillator-regenerative amplifier and a Nd:YAG boost amplifier. The pump laser beam is generated from the pump laser system, passes through the first image-relay system, and is frequency-doubled in the frequency-doubling crystal. The signal laser system on a second optical pathway comprises a Ti:sapphire regenerative amplifier and generates the signal laser beam, which passes through the pulse stretcher and is temporally chirped and imposed with an angular dispersion by the first grating. The chirped signal beam and pump laser beam are intersected with a noncollinear angle of >5° in the crystal amplifier for temperature-insensitive phase-matching (PM). By optimizing grating constant of the first grating, the chirped signal is imposed with appropriate amount of angular dispersion for wavelength-insensitive PM.

4 Claims, 5 Drawing Sheets

NONCOLLINEAR ACHROMATIC PHASE MATCHING BASED OPTICAL PARAMETRIC CHIRPED-PULSE AMPLIFIER WITH INSENSITIVITY TO TEMPERATURE AND WAVELENGTH

CROSS-REFERENCE AND RELATED APPLICATION

The subject application claims priority on Chinese patent application No. 201610910788.9 filed on Oct. 19, 2016. The Chinese priority application is incorporated herein by reference.

FIELD OF INVENTION

The present invention relates to ultra-short laser amplification, particularly, an optical parametric chirped-pulse amplifier that is simultaneously insensitive to temperature and wavelength.

DESCRIPTION OF RELATED ARTS

Optical parametric chirped-pulse amplification (OPCPA) has been promising for pushing femtosecond pulses towards ultra-high peak powers. However, the technology still faces several obstacles, one of which is how to achieve high-average and high-peak power simultaneously. Currently, the peak power has been boosted to hundreds of terawatts in the OPCPA. The average power, however, remains restricted to several tens of watts, which is far less than the desired power level in ultrafast field. The reason is that absorption in OPCPA caused by material impurities is inevitable, particularly in the ultraviolet and mid-infrared spectral regions. The absorption of the interacting waves non-uniformly heats the crystal and consequently induces phase-mismatch among the spectra. The type of phase-mismatch distortions degrades the conversion efficiency and distorts the spectral and temporal profiles of the signal pulses and thus places an inherent limitation on power scaling in the OPCPA.

The difficulty of achieving simultaneous temperature- and wavelength-insensitive parametric amplifier comes from the lack of control parameter in manipulating the phase matching (PM) configuration. Traditionally, the noncollinear PM provides the possibility of wavelength-insensitive amplification and few-cycle pulses have been demonstrated. However, due to lack of control parameters for achieving temperature-insensitive PM, the energy conversion efficiency drops and the output power decreases once the ambient temperature deviates from the operating temperature. Currently, the main solution to high-average power OPCPA system relies on heat removal, while achieving simultaneous temperature- and wavelength-insensitive parametric amplifier has never been proposed.

SUMMARY OF THE INVENTION

The present invention provides a temperature- and wavelength-insensitive parametric amplifier that is used to simultaneously boost the average- and peak-power of few-cycle pulses.

In the present invention, phase matching (PM) condition is the inherent factor that governs the energy-conversion efficiency and amplification bandwidth in the OPCPA. The noncollinear angle between the pump and signal is an effective control parameter in manipulation the PM. In traditional noncollinear PM, the noncollinear angle is mainly devoted to eliminating the group-velocity mismatch (GVM) between the signal and the idler. Thus, a wavelength-insensitive PM may be achieved. In the present invention, the noncollinear angle is transformed for the temperature-insensitive PM when the noncollinear angle is properly reset. In addition, the seed signal is angularly dispersed before amplification. The angular-dispersion is employed for eliminating the GVM between the seed and the idler for achieving wavelength-insensitive PM. Based on the two control parameters (i.e., the noncollinear angle and the angular dispersion), simultaneous temperature- and wavelength-insensitive parametric amplifier may be obtained.

The present invention provides a simultaneously temperature- and wavelength-insensitive parametric amplifier that comprises a pump laser, a signal laser, and a crystal amplifier. The pump laser comprises a Nd:YVO$_4$ laser oscillator-regenerative amplifier and a Nd:YAG boost amplifier. After an image-relay system, the pump laser is frequency-doubled in a nonlinear crystal. The signal laser is produced with a Ti:sapphire regenerative amplifier. After the stretcher, the signal laser is temporally chirped and the angular dispersion is imposed onto the signal beam with a grating. After the amplification process in the crystal amplifier, the amplified signal is re-collimated with a grating and is then compressed in the compressor. The pump laser and the chirped signal is synchronized with an electronic phase-locking loop. In the amplification stage, the pump energy flows into the signal laser. By adjusting the direction of the reflector in the pump path, the signal and pump lasers are intersected with a noncollinear angle in the crystal amplifier.

In the present invention, the noncollinear angle between the pump and signal is >5° and the amount of the angular dispersion is between 100 μrad/nm and 400 μrad/nm.

In the present invention, the gratings may be replaced with prisms or grating pairs.

The present invention is able to support simultaneous temperature- and wavelength-insensitive PM, which provides a promising route to the generation of ultrashort pulse with both high-peak power and high-average power. These and other objectives, features, and advantages of the present invention will become apparent from the following detailed description, the accompanying drawings, and the appended claims.

BRIEF DESCRIPTION OF THE DRAWINGS

FIG. 1 shows comparison of the constitution and gain profile of the amplifiers of the prior art and the present invention, among which, FIG. 1(a) shows the constitution of the traditional amplifier; FIG. 1(b) shows the constitution of the amplifier of the present invention; FIG. 1(c) shows the gain profile of the amplifier of the prior art; and FIG. 1(d) shows the gain profile of the amplifier of the present invention.

FIG. 3 shows the roles of the noncollinear angle in manipulating the OPCPA PM, among which FIG. 3(a) shows the first derivative of the phase-mismatch with respect to signal frequency ($\partial \Delta k/\partial \omega_s$) versus the noncollinear angle α, FIG. 3(b) shows the dependence of the phase-mismatch (Δk) on the signal frequency, and FIG. 3(c) shows the dependence of the phase-mismatch (Δk) on temperature, both FIGS. 3(b) and 3(c) show the traditional OPCPA amplifier; FIG. 3(d) shows the effect of the noncollinear angle in manipulating the first derivative of the phase-mismatch, FIG. 3(e) shows the effect with respect to Δk versus the signal frequency, and FIG. 3(f) shows the effect with respect to Δk versus the temperature, both FIGS. 3(e) and 3(f) show in the amplifier of the present invention.

FIG. 4 shows the angular dispersion being further imposed onto the seed signal, among which, FIG. 4(a) shows the influence of the angular dispersion (∂α/∂λ$_s$) on ∂Δk/∂ω$_s$ when ∂Δk/∂T=0; FIG. 4(b) shows the dependence of Δk on frequency when the signal is imposed with an angular dispersion of 300 μrad/nm by optimizing grating constant; FIG. 4(c) shows the feasibility of the present invention at different temperatures and FIG. 4(d) shows the feasibility of the present invention at different wavelengths; FIG. 4(e) shows the nonlinear angular dispersion, and FIG. 4(f) shows its effect on pulse characteristic in the amplifier of the present invention.

FIG. 5 shows the signal efficiency evolution versus crystal length and temperature, among which, FIG. 5(a) shows the evolution of the efficiency inside the crystal at different temperatures in the traditional OPCPA amplifier, FIG. 5(b) shows the evolution of the efficiency inside the crystal at different temperatures in the amplifier of the present invention; FIG. 5(c) shows the output efficiency versus temperature for the traditional OPCPA amplifier and the amplifier of the present invention.

FIG. 6 shows the effects of noncollinear angle and angular dispersion in a proof-of-principle experiment for the present invention, among which, FIG. 6(a) shows measured signal efficiency versus temperature deviation for several noncollinear angles; FIG. 6(b) shows measured spectra of the amplified signal with different amount of external angular dispersion.

FIG. 7 shows the spectral and temporal profiles of the amplified signal in the traditional OPCPA amplifier and the amplifier of the present invention, among which, FIG. 7(a) shows the signal spectrum at ΔT=0 K in the traditional OPCPA amplifier; FIG. 7(c) shows the signal spectrum at ΔT=0 K in the amplifier of the present invention; FIG. 7(b) shows the transform-limited pulses corresponding to the spectrums in FIG. 7(a) in the traditional OPCPA amplifier; FIG. 7(d) shows the transform-limited pulses corresponding to the spectrums in FIG. 7(c) in the amplifier of the present invention; FIG. 7(e) shows the signal spectrum at ΔT=5 K in the traditional OPCPA amplifier; FIG. 7(g) shows the signal spectrum at ΔT=5 K in the amplifier of the present invention; FIG. 7(f) shows the transform-limited pulses corresponding to the spectrums in FIG. 7(e); and FIG. 7(h) shows the transform-limited pulses corresponding to the spectrums in FIG. 7(g).

Reference numbers are used to describe the following structures:
1—Nd:YVO$_4$ laser oscillator-regenerative amplifier; 2—Nd:YAG boost amplifier; 3—first image-relay system; 4—frequency-doubling crystal; 5—reflector; 6—electronic phase-locking loop; 7—Ti:sapphire amplifier; 8—pulse stretcher; 9—first grating; 10—chirped signal with angular dispersion; 11—second image-relay system; 12—pump beam; 13—nonlinear optical crystal for parametric amplification; 14—second grating; 15—pulse compressor; 16—compressed signal.

DETAILED DESCRIPTION OF THE INVENTION AND EMBODIMENTS

The present invention is further described according to a group of numerical simulation and experimental results.

Figure 1:
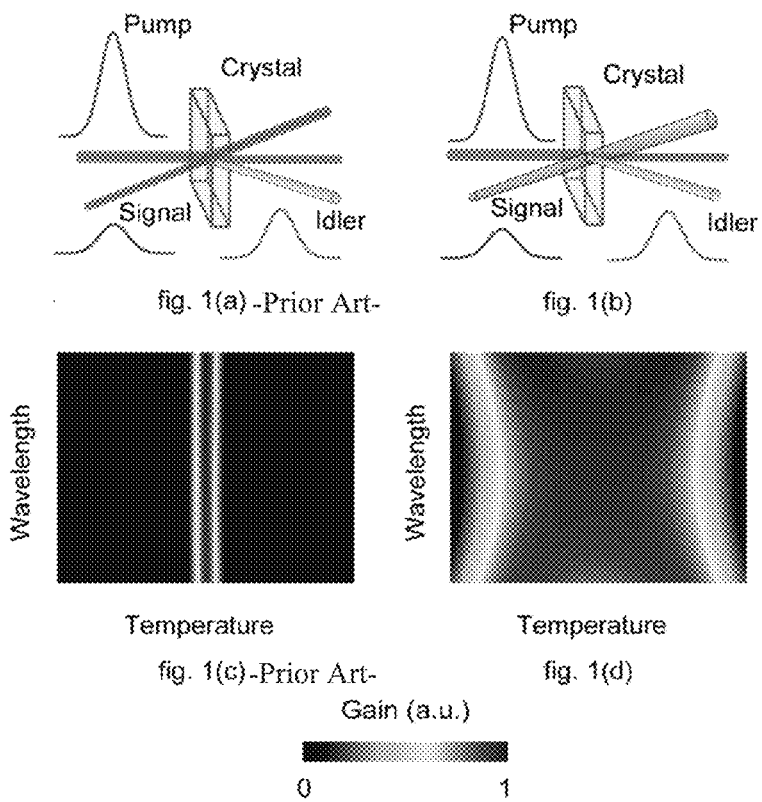

FIG. 1 compares the optical setup and the performance of the traditional OPCPA amplifier and the present invention. In the traditional OPCPA amplifier as shown in FIG. 1(a), the pump and signal are intersected with an angle <5° in the crystal amplifier. As a consequence, as shown in FIG. 1(c), the spectral bandwidth is larger than 100 nm, whereas the temperature bandwidth is smaller than 5 K. In the amplifier of the present invention as shown in FIG. 1(b), the noncollinear angle is reset (>5°) and the signal is angularly dispersed as shown in FIG. 1(d). Due to the two control parameters, the present amplifier is insensitive to both temperature and wavelength.

In the traditional OPCPA amplifier as shown in FIG. 1(a), the pump and signal is intersected with a noncollinear angle. Due to the ability to manipulate the phase matching, the amplifier is insensitive to the wavelength and, in consequence, ultrashort pulses may be generated. However, due to lack of additional control parameter, the amplifier is sensitive to the temperature, as indicated by the gain drop in FIG. 1(c). In contrast, in the amplifier of the present invention as shown in FIG. 1(b), by resetting the direction of the reflector in the pump path, the amplifier may be made to be insensitive to temperature when the noncollinear angle is reset to >5° as seen in FIG. 1(d). In addition, the signal is angularly dispersed by optimizing the grating constant in the signal path. Based on this, the group-velocity mismatch between the signal and idler may be eliminated with the amount of angular dispersion between 200 μrad/nm to 400 μrad/nm. As a result, wavelength-insensitive amplification may be achieved with the angular dispersion. Because of the two control parameters, in the present invention, the amplifier is insensitive to both the temperature and wavelength.

Figure 2:
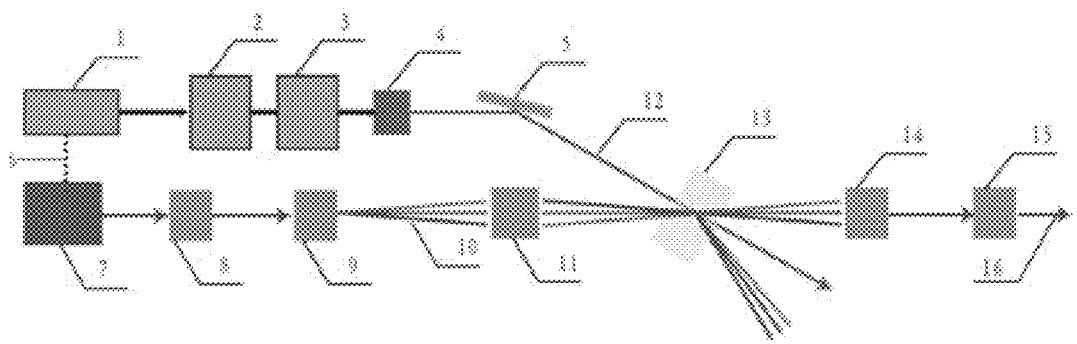
FIG. 2 shows the optical setup of the amplifier of the present invention.

FIG. 2 shows a schematic view of the devices used in the present invention. The system comprises the pump, the signal, and the crystal amplifier. The pump laser comprises a Nd:YVO$_4$ laser oscillator-regenerative amplifier and a Nd:YAG boost amplifier. After an image-relay system, the pump laser is frequency-doubled in a nonlinear crystal. The signal laser is produced with a Ti:sapphire regenerative amplifier. After the stretcher, the signal laser is temporally chirped and the angular dispersion is imposed onto the signal beam with a grating. After the amplification process in the crystal amplifier, the amplified signal is re-collimated with a grating and is then compressed in the compressor. The pump laser and the chirped signal is synchronized with an electronic phase-locking loop. In the amplification stage, the pump energy flows into the signal laser. By adjusting the direction of the reflector in the pump path, the signal and pump lasers are intersected with a noncollinear angle in the crystal amplifier.

In the present invention, lithium triborate (LBO) is selected as the nonlinear crystal due to its favorable characteristics of high damage threshold, small spatial walk-off and large aperture. It is noteworthy that the present invention is not limited to specific crystal. For example, Yttrium calcium oxyborate, another widely-used crystal, is also a good candidate for the present invention. The pump and signal wavelength is chosen as 532 nm and 800 nm, respectively.

Figure 3:
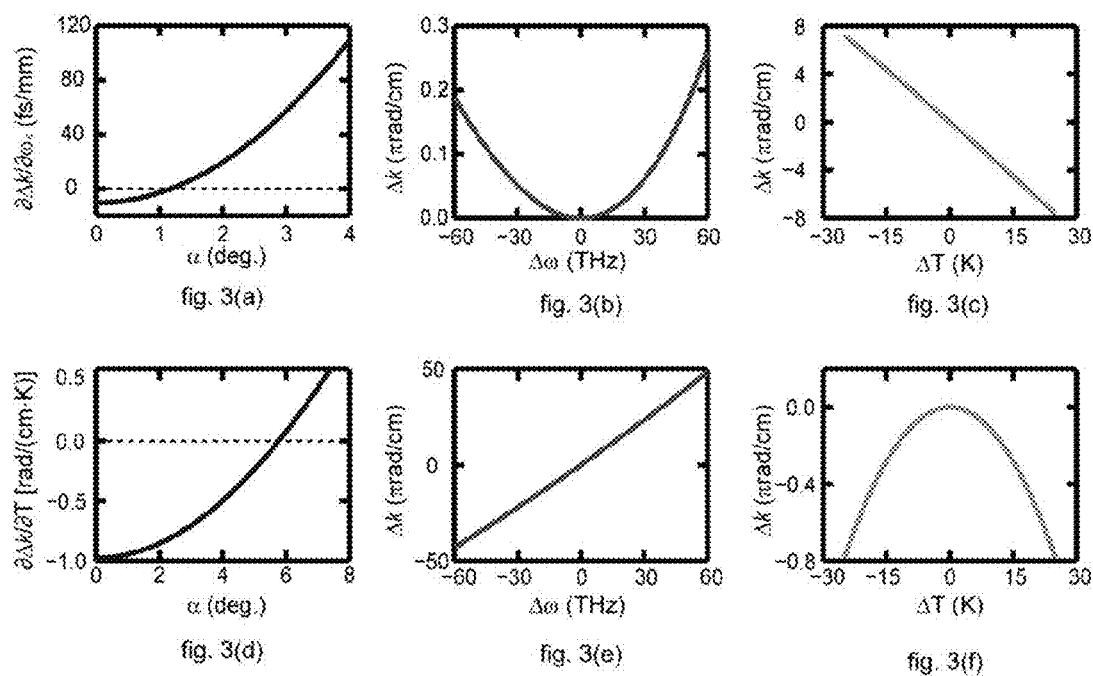

FIG. 3 shows the roles of the noncollinear angle in manipulating the OPCPA PM. In FIG. 3(a), the first derivative of the phase-mismatch is plotted with respect to the signal frequency (∂Δk/∂ω$_s$) versus the noncollinear angle α. When the group-velocities of the signal and idler are matched (α=1.18°), ∂Δk/∂ω$_s$ vanishes exactly, and wavelength-insensitive PM is achieved, corresponding to the traditional OPCPA amplifier. As a result, the dependence of the phase-mismatch Δk on the frequency, which is dominated by the second derivative of the phase-mismatch term (i.e., $\partial^2\Delta k/\partial\omega_s^2$), is very weak ($|\Delta k|<2$ πrad/cm), as shown in FIG. 3(b). However, the phase-mismatch is linearly dependent on temperature with a large slope ($|\partial\Delta k/\partial T|\cdot|\Delta T|>2$ πrad/cm), indicating that the PM is highly sensitive to temperature, as shown in FIG. 3(c). To verify the feasibility of the noncollinear configuration to achieve temperature-insensitive PM, in FIG. 3(d), the first derivative of the phase-mismatch is plotted with respect to temperature ($\partial\Delta k/\partial T$) versus the noncollinear angle α. When the noncollinear angle is properly reset (α=5.77°), $\partial\Delta k/\partial T$ vanishes exactly, and temperature-insensitive PM is achieved. Thus, the dependence of the phase-mismatch on temperature, which is dominated by the second derivative of the phase-mismatch term (i.e., $\partial^2\Delta k/\partial T^2$), is very weak, as shown in FIG. 3(f). FIG. 3(e) shows the dependence of phase-mismatch on the frequency. Because the noncollinear angle in this case largely differs from that required for wavelength-insensitive PM, group-velocity mismatch between the signal and idler arises. Consequently, the phase-mismatch is linearly dependent on the frequency, and the PM is highly sensitive ($|\Delta k|>2$ πrad/cm) to the wavelength. Thus, in the present invention, additional control parameter is further required to achieve simultaneous temperature- and wavelength-insensitive amplifier.

Figure 4:
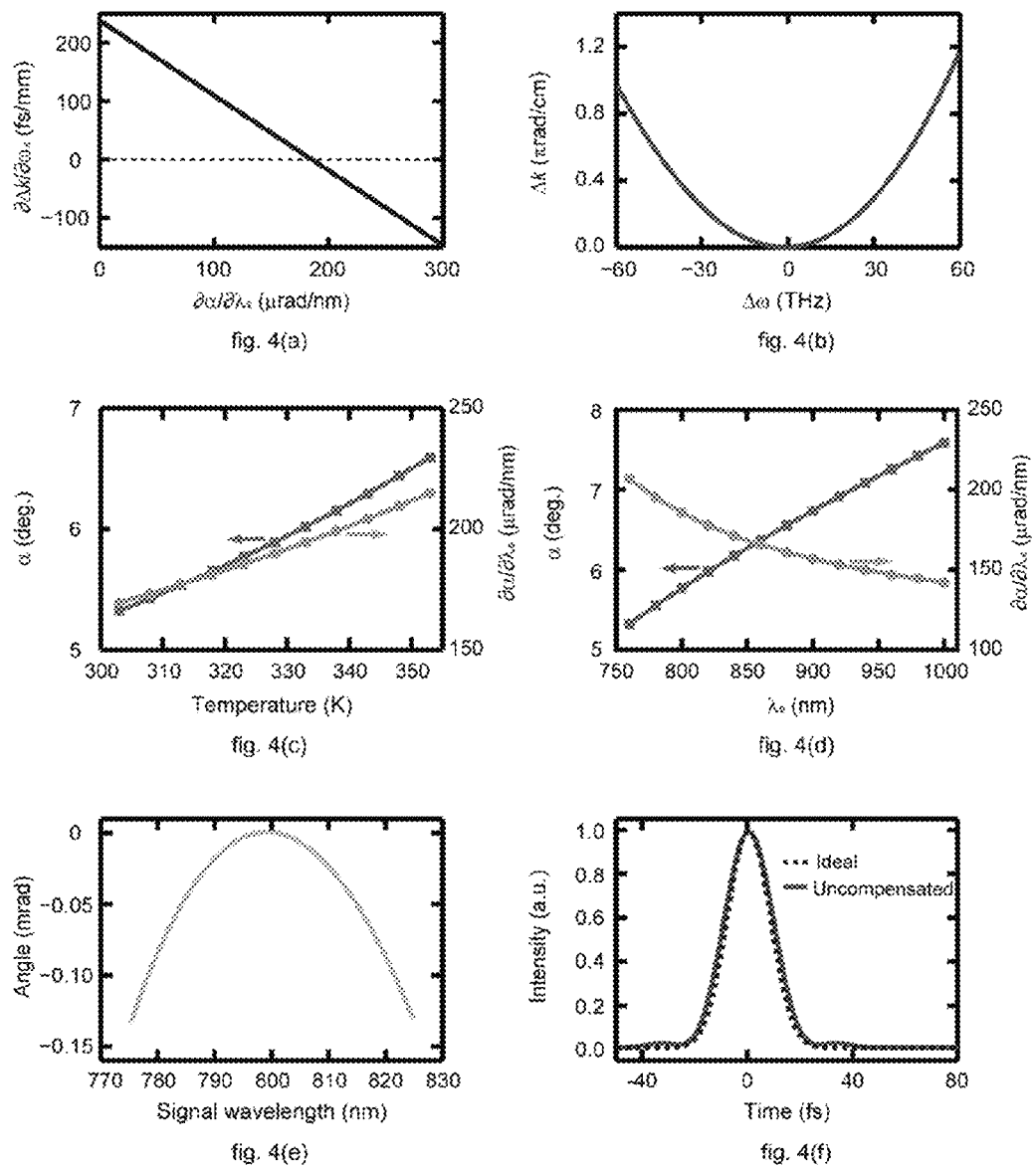

Based on these considerations, angular dispersion is further imposed onto the seed signal. FIG. 4(a) shows the dependence of $\partial\Delta k/\partial\omega_s$ on the angular dispersion at the noncollinear angle of 5.77°. $\partial\Delta k/\partial\omega_s$ is linearly dependent on angular dispersion. With an angular dispersion of ~186 μrad/nm inside the crystal, $\partial\Delta k/\partial\omega_s$ vanishes exactly, and wavelength-insensitive PM is achieved. Similar to the traditional OPCPA amplifier, the phase-mismatch is also very weak and is mainly determined by $\partial^2\Delta k/\partial\omega_s^2$ as shown in FIG. 4(b).

The present amplifier may be applicable at different operating temperatures if the noncollinear angle and angular dispersion are properly set. FIG. 4(c) shows the required noncollinear angle and angular dispersion for NAPM at different operating temperatures.

The present amplifier is also effective for the case with varied signal wavelengths as shown in FIG. 4(d). In OPCPA amplifier, the nonlinear angular dispersion may be introduced. It is then essential to address the effect of the nonlinear (i.e., high-order) angular dispersion, particularly in the case of large bandwidth.

Since the signal amplification in OPCPA is largely governed by the PM condition, the nonlinear angular dispersion may be simply predicted by the PM property. As shown in FIG. 4(e), the nonlinear angular dispersion is dominated by a second-order angular dispersion of ~−0.42 μrad/nm². The effect of this nonlinear angular dispersion will only stretch the pulse duration from an ideal value of 19 fs (Fourier transform-limited) to 20 fs and thus can be ignored as shown in FIG. 4(f).

Based on the symmetric split-step Fast Fourier Transform and the fourth-order Runge-Kutta method, the amplification characteristics in traditional OPCPA amplifier and that of the present invention are numerically compared. In the simulations, both the pump and chirped signal durations (full width at half maximum) are designated to be 10 ps with a Gaussian profile. The pump intensities are selected to ensure a same nonlinear length. The small signal gain is designed to be ~1000 with a crystal length of 15 mm. The intensity ratio ($I_p/I_s$) is fixed at 100:1 in both cases, which is typical for the high energy/final stage amplifiers. To simply illustrate the role of the thermally-induced phase-mismatch in amplification, the real temperature distribution inside the crystal is not addressed. Alternatively, thermal effects are considered by the temperature-dependent phase-mismatch Δk(T) term.

Figure 5:
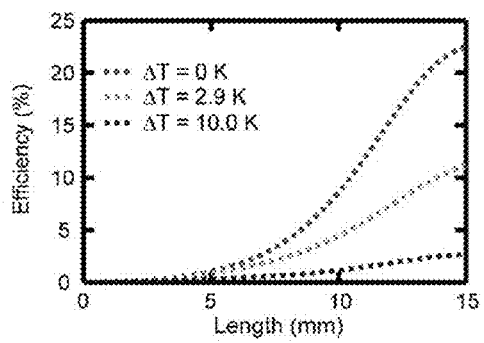
Figure 5:
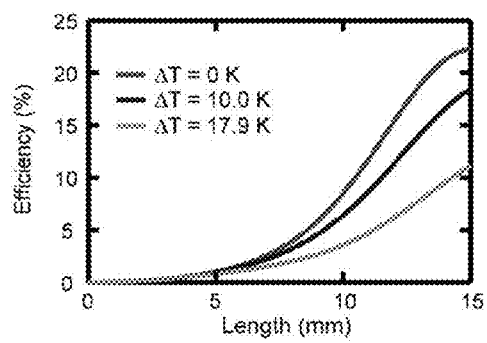
Figure 5:
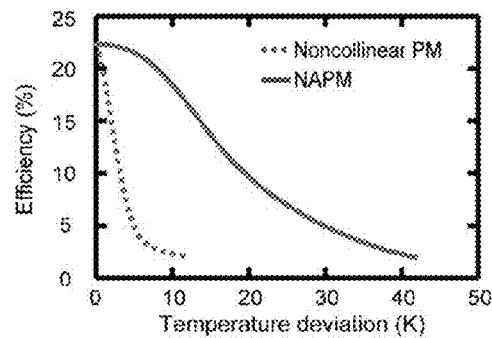

FIG. 5(a) presents the signal efficiency evolution in a 15-mm LBO crystal for the traditional OPCPA amplifier. At the operating temperature (ΔT=0 K), the efficiency increases with increasing crystal length and reaches a maximum value of 22.4% at the chosen length of 15 mm. When the temperature deviates from the operating temperature (ΔT≠0 K), signal amplification still occurs, but the efficiency drops significantly because of the thermally-induced phase-mismatch. The efficiency is degraded to a greater extent by larger temperature deviations. For instance, the output efficiencies decrease to only 11.2% and 2.3% at temperature deviations of 2.9 and 10.0 K, respectively. Similar behaviors can also be observed in the amplifier of the present invention as shown in FIG. 5(b). However, the thermal effects are markedly alleviated in the amplifier of the present invention. The output efficiency remains 18.5% (11.2%) at a larger temperature deviation of 10.0 K (17.9 K). FIG. 4(c) shows the dependence of the output efficiency on temperature in the traditional OPCPA amplifier and the amplifier of the present invention. The efficiencies decrease as the temperature deviation increases in both schemes; nevertheless, the efficiency decreases much more slowly in the present invention. Quantitatively, the thermal acceptance is as large as 17.9 K in the present invention, which is more than 6 times larger than that observed in traditional OPCPA amplifier (2.9 K).

To demonstrate the present invention, a proof-of-principle experiment has been implemented. For the NAPM, the angular dispersion is controlled by tuning the parallel misalignment of the grating pair (1480 line/mm) in the stretcher. An image-relay telescope has been adopted to maintain the angular dispersion, thus no spatial chirp is introduced and the temporal chirp is not altered. Both the traditional OPCPA amplifier and the amplifier of the present invention are characterized using 25-mm-thick LBO crystals. The crystal angle is θ=90°, ϕ=12.0° and θ=90°, ϕ=51.2° for the traditional OPCPA amplifier and the amplifier of the present invention.

Figure 6:
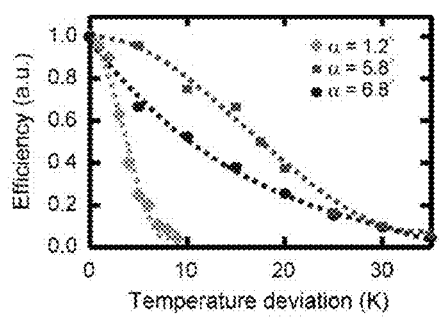
Figure 6:
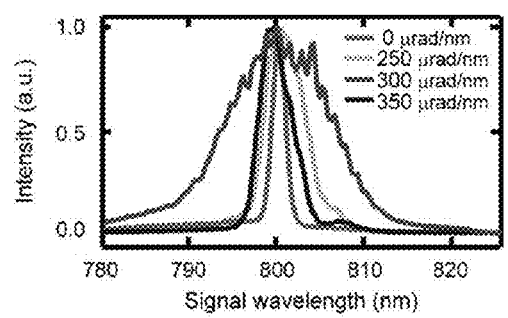

To illustrate the role of the noncollinear configuration in increasing the thermal acceptance, the signal efficiency versus temperature is studied for several noncollinear angles as shown in FIG. 6(a). At the operating temperature, signal efficiency of ~11% (~12%) is obtained in the amplifier of the present invention (traditional OPCPA amplifier). Due to the large value of $|\partial\Delta k/\partial T|$, the thermal acceptance in the traditional OPCPA amplifier (α=1.2°) is as small as ~3 K, which is in good agreement with the numerical results. As a result of the decreasing $|\partial\Delta k/\partial T|$, the thermal acceptance becomes larger as the noncollinear angle is increased. In particular, maximum thermal acceptance (~17 K) is observed when $|\partial\Delta k/\partial T|$ is eliminated in the amplifier of the present invention (α=5.8°). The effect of the angular dispersion on spectral bandwidth is shown in FIG. 6(b). Maximum spectral bandwidth is achieved when $\partial\Delta k/\partial\omega_s$ is eliminated at the optimum amount of angular dispersion (~300 μrad/nm outsider the crystal) in the present invention, while bandwidth narrowing occurs when the angular dispersion is not set properly.

Figure 7:
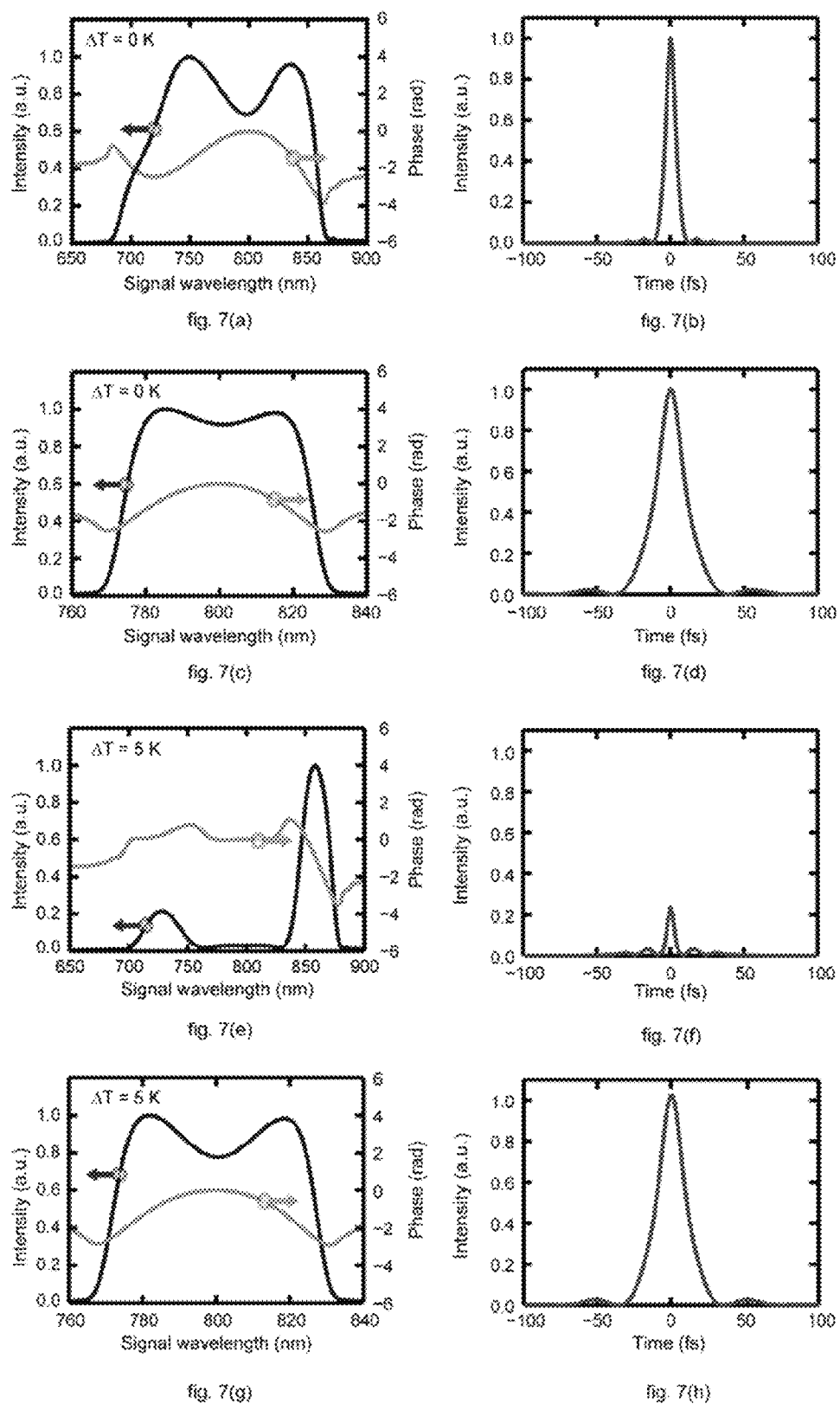

In addition to a larger thermal acceptance, the present invention is also able to support the amplification of femtosecond pulses of ~20 fs. For comparison, FIG. 7(a) shows the spectra of the amplified signal pulses in the traditional OPCPA amplifier at the operating temperature. If the OPP is compensated, the transform-limited pulse may be obtained with a duration of 7.7 fs, as shown in FIG. 7(b). FIGS. 7(c) and 7(d) show the amplified signal spectrum and pulse profile in the present invention at the operating temperature. Because of the residual uncompensated $\partial^2\Delta k/\partial\omega^2$, the duration of the transform-limited pulse is ~20 fs in the NAPM. However, the advantages of the present invention are revealed when the temperature deviates from the operating temperature, which is inevitable in high average power OPCPA amplifier. In this case, both the spectrum and pulse profile are influenced by the thermal-induced phase-mismatch. For instance, with a temperature deviation of 5 K, the spectrum in traditional OPCPA amplifier is severely distorted as shown in FIG. 7(e). In the time domain, because of the low efficiency, the intensity decreases to 30% of that at the operating temperature as shown in FIG. 7(f). In contrast, the present invention is robust with respect to temperature. As seen in FIG. 7(g), the spectral distortion is almost negligible compared with that in the traditional OPCPA amplifier.

Meanwhile, the signal intensity remains almost unchanged as shown in FIG. 7(h), which is desirable for power scaling. Because of the short pulse duration and large thermal acceptance, ultrafast pulses with both high peak and average powers can be anticipated in the present invention.

In conclusion, the two control parameters (i.e., the noncollinear configuration and angular dispersion) make it possible to achieve simultaneous temperature- and wavelength-insensitive parametric amplifier. The amplifier of the present invention may be applied to generate ultra-short pulses with both ultra-high-peak and high-average power, which are very critical in high-intensity laser science.

One skilled in the art will understand that the embodiment of the present invention as shown in the drawings and described above is exemplary only and not intended to be limiting. It is thus seen that the objects of the present invention have been fully and effectively accomplished. Its embodiments have been shown and described for the purposes of illustrating the functional and structural principles of the present invention and is subject to change without departure from such principles. Therefore, the present invention includes all modifications encompassed within the spirit and scope of the following claims.

What is claimed is:

1. A simultaneous temperature- and wavelength-insensitive parametric amplifier system, comprising
    a pump laser system on a first optical pathway, the pump laser system comprising a Nd:YVO$_4$ laser oscillator-regenerative amplifier and a Nd:YAG boost amplifier that are sequentially arranged on the first optical pathway,
    a first image relay system arranged on the first optical pathway after the pump laser system,
    a frequency-doubling crystal arranged on the first optical pathway after the first image relay system,
    a reflector on the first optical pathway arranged after the frequency-doubling crystal,
    a signal laser system on a second optical pathway, the signal laser system comprises a Ti:sapphire regenerative amplifier,
    a pulse stretcher on the second optical pathway after the signal laser system,
    a first grating arranged on the second optical pathway after the pulse stretcher,
    a second grating,
    a pulse compressor arranged along a same optical pathway after the second grating,
    an electronic phase-locking loop, and
    a nonlinear crystal amplifier,
    wherein the pump laser system and the signal system are synchronized with the electronic phase-locking loop;
    a pump laser beam is generated from the pump laser system, passes through the first image-relay system, and is frequency-doubled in the frequency-doubling crystal;
    a signal laser beam is generated from the signal laser system, passes through the pulse stretcher, and is temporally chirped and imposed with an angular dispersion by the first grating;
    the chirped signal laser beam is amplified in the nonlinear crystal amplifier, and the amplified chirped signal laser beam is re-collimated by the second grating and compressed in the compressor;
    energy flows from the pump laser beam into the signal laser beam during amplification in the nonlinear crystal amplifier; and
    By adjusting a direction of the reflector in the first optical pathway, the signal laser beam and the pump laser beam are intersected with a noncollinear angle in the nonlinear crystal amplifier.

2. The simultaneous temperature- and wavelength-insensitive parametric amplifier as described in claim 1, wherein the noncollinear angle between the pump laser beam and the signal laser beam is >5°.

3. The simultaneous temperature- and wavelength-insensitive parametric amplifier as described in claim 1, wherein the angular dispersion is between 100 μrad/nm and 400 μrad/nm.

4. The simultaneous temperature- and wavelength-insensitive parametric amplifier as described in claim 1, wherein the first grating or the second grating is replaced with a prism or a grating pair.

* * * * *